United States Patent

[11] 3,569,731

| [72] | Inventor | Horacio E. Gavira |
| | | Lakewood, Calif. |
| [21] | Appl. No. | 754,062 |
| [22] | Filed | Aug. 20, 1968 |
| [45] | Patented | Mar. 9, 1971 |
| [73] | Assignee | The United States of America as represented by the Secretary of the Air Force |

[54] VOLTAGE LEVEL DETECTOR
3 Claims, 4 Drawing Figs.

[52] U.S. Cl. .................................................. 307/219,
307/106, 307/204, 307/211, 307/235, 330/30,
330/136, 330/141
[51] Int. Cl. .................................................. G06f 11/08
[50] Field of Search.......................................... 307/230,
235, 106, 107, 108, 204, 211, 219; 330/30, 136, 141

[56] References Cited
UNITED STATES PATENTS

| 3,371,269 | 2/1968 | Wattson | 307/230 |
| 3,378,780 | 4/1968 | Lin | 330/30 |
| 3,416,004 | 12/1968 | Taylor | 307/235 |
| 3,471,794 | 10/1969 | Gugliotti | 330/30 |
| 3,471,715 | 10/1969 | Castelli | 330/30 |
| 3,474,258 | 10/1969 | Nagy | 330/30 |

Primary Examiner—Donald D. Forrer
Assistant Examiner—L. N. Anagnos
Attorneys—Harry A. Herbert, Jr and Willard R. Matthews, Jr ABSTRACT: The invention comprises a voltage level detector having a "dead band" between its set and reset points. The critical level or significant end of the "dead band" is desensitized to temperature variations and drift by positive and negative feedback in combination with a circuit adapted to compensate for variations of the voltage amplifier transistor transconductance. Significant system components include a feedback circuit between the detector's differential amplifier and voltage amplifier, a temperature compensation circuit associated with the voltage amplifier, and a time delay circuit. The invention also comprehends a voltage monitoring system employing three such voltage level detectors in combination with a "majority voting" logic circuit.

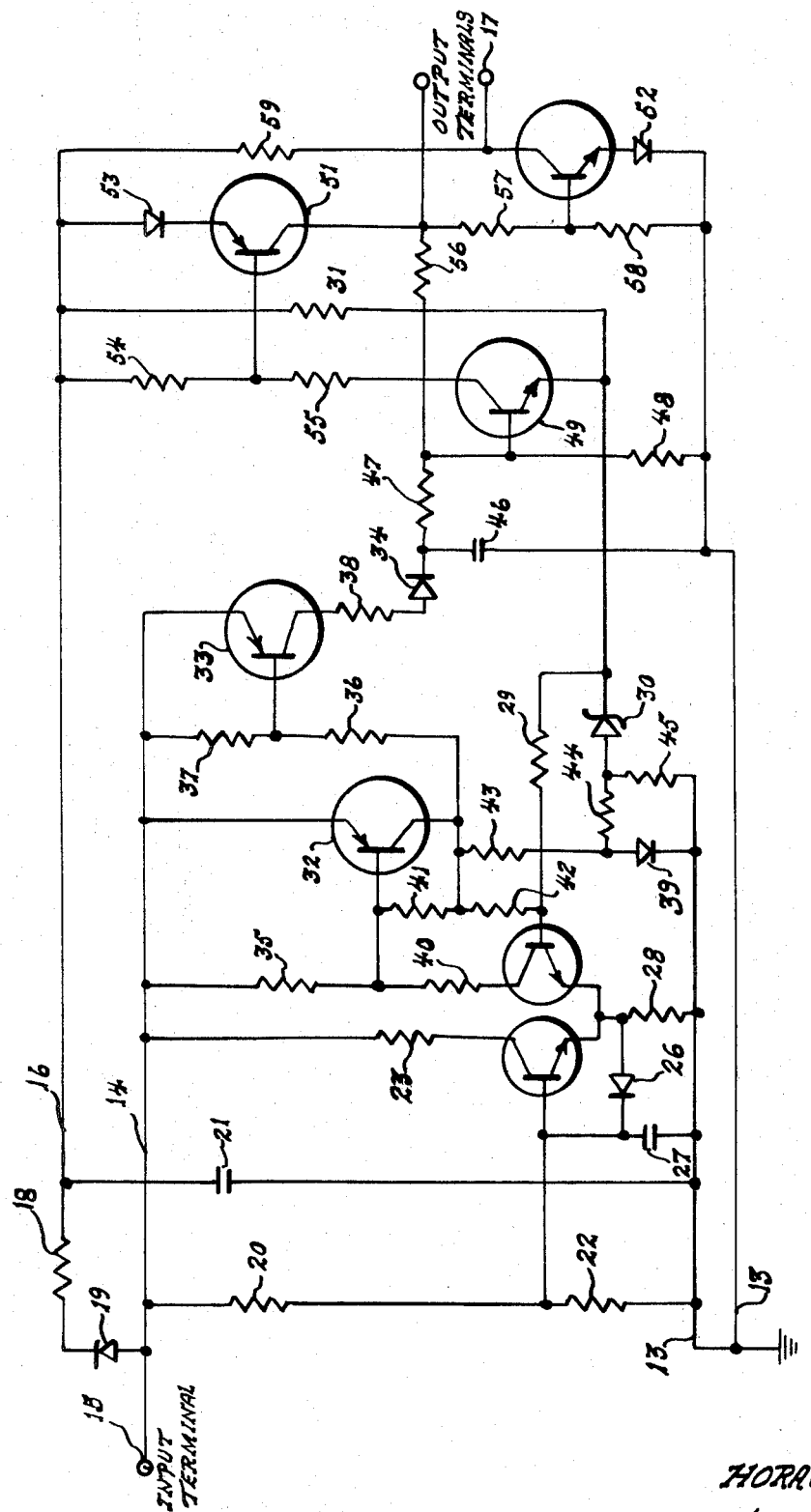

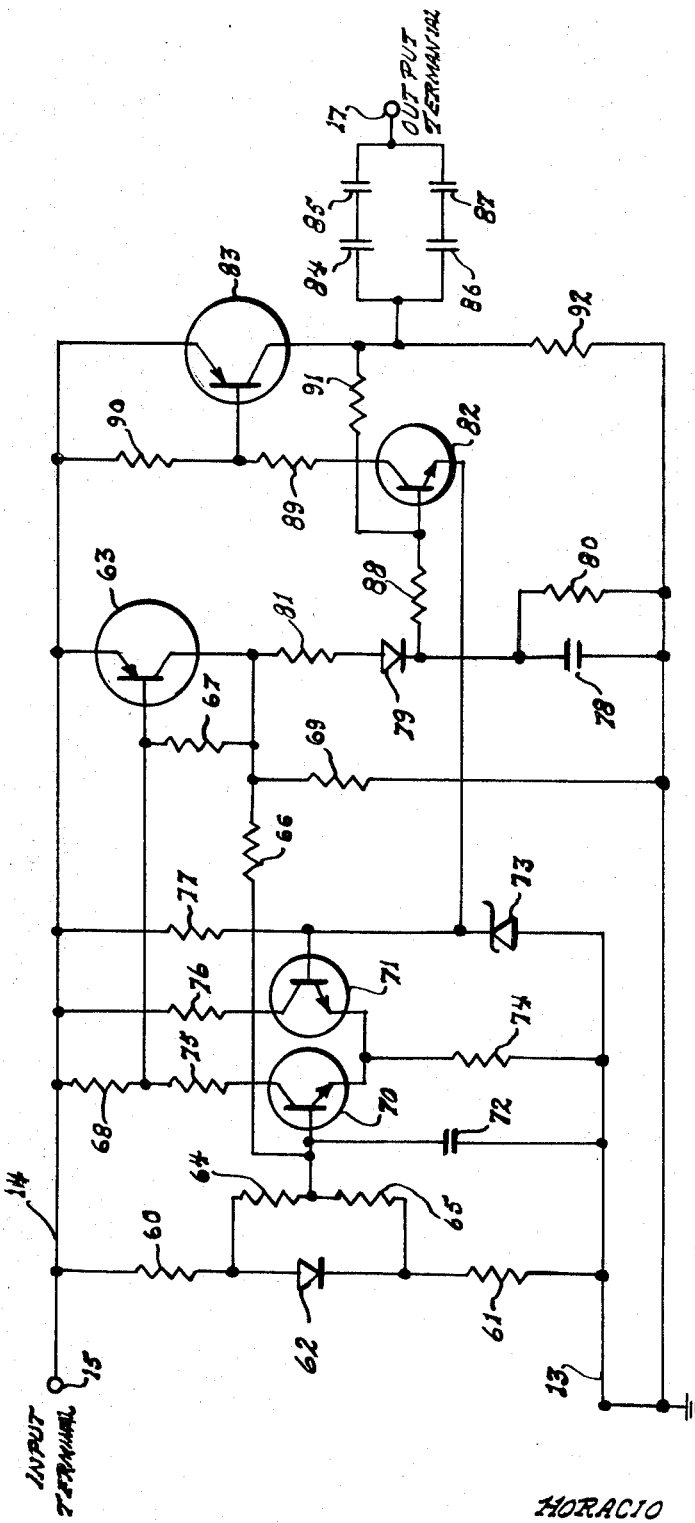

VOLTAGE LEVEL DETECTOR

BACKGROUND OF THE INVENTION

This invention relates to circuits for monitoring and controlling system voltages and in particular to voltage level detectors having unique circuits that effect improved resolution, stability and temperature compensation.

Currently available voltage detectors are incapable of precisely detecting the crossing of critical voltages. The inability to detect critical limits adversely affects undervoltage and overvoltage detectors by creating undue stresses in the circuitry. In systems utilizing monitors with digital readouts, erroneous parameter displays are frequently encountered. Furthermore, the use of current state of the art devices as sensors of solar array capacity in spacecraft applications results in poor utilization of the solar array power available for the communications system.

Engineers have in the past resorted to highly sensitive detectors of threshold voltage in order to overcome these deficiencies. These detectors, however, cause the circuit to respond to noise and other transient phenomena present in the system. Detectors of this type also tend to oscillate when the critical crossing is approached slowly. The use of a cascaded ime delay network to overcome this problem introduces time delay discrepancies in addition to voltage detection inaccuracies to the system output.

The present invention is directed toward overcoming these and other deficiencies prevalent in current state of the art voltage detection systems.

SUMMARY OF THE INVENTION

The present invention comprehends a novel voltage detector having differential amplifier, voltage amplifier and output stages. A dead band which may conveniently be made one volt wide is introduced between the set and reset points of the circuit. This has the effect of eliminating the undesirable effects of input voltage misrecognition and the tendency to oscillate common to known voltage detectors. A resistor feedback circuit associated with the transistorized voltage amplifier permits the gain of the amplifier to be fixed prior to the occurrence of an undervoltage ondition and during its regenerative switching function. Since variation of the DC transconductance in the voltage amplifier transistor is referred to the input circuit of one differential amplifier transistor in the form of a change of bias voltage, it is possible to compensate for temperature variations. This is accomplished by a diode-resistance circuit connected between the emitter of the voltage amplifier transistor and ground. A time delay stage comprising a capacitor-resistance circuit is provided between the output of the voltage amplifier and the output stage of the detector. This time delay stage provides the voltage detector with a precisely controlled integrator circuit capable of maintaining a constant rate of integration when set level has been crossed. Such an arrangement prevents the introduction of time delay discrepancies when the set level is reached at low speeds.

The present invention further comprehends a novel voltage monitoring system comprising three closely matched detectors of the type described above in combination with a majority voting logic circuit. This configuration significantly increases the reliability of the voltage detector and renders it impervious to any single part failure. This system is also capable of completely isolating any single failure either in the time delay networks or in the voltage detection stages.

It is a principal object of this invention to provide a voltage level detector that is capable of precisely detecting the crossing of critical voltages.

It is a principal object of this invention to provide a voltage level detector that will operate effectively without causing undue stress to its associated circuitry.

It is another object of this invention to provide a voltage level detector that will not oscillate when critical voltages are approached slowly.

It is another object of this invention to provide a voltage level detector having better resolution than currently available devices.

It is another object of this invention to provide a voltage level detector wherein the uncertainties in trigger logic prevalent in the state of the art devices are eliminated.

It is another object of the invention to provide a voltage level detector wherein the set level is accurately maintained throughout large temperature variations.

It is another object of the invention to provide a voltage level detector that is insensitive to instantaneous voltage excursions.

These, together with other objects, advantages and features of the invention, will become more apparent from the following detailed description when taken in conjunction with the illustrative embodiments in the accompanying drawings.

DESCRIPTION OF THE DRAWINGS

FIG. 2 is a detailed schematic diagram of one presently preferred embodiment of the invention;

FIG. 3 is a detailed schematic diagram of an alternative embodiment of the invention.

DESCRIPTION OF THE PREFERRED EMBODIMENTS

Figure 1:
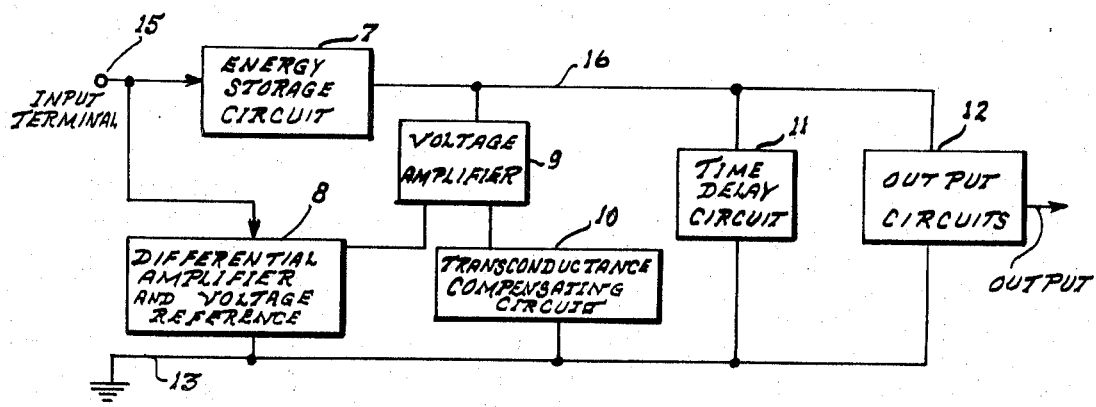
FIG. 1 is a block diagram of a voltage level detector embodying the principles of the present invention.

Referring now to FIG. 1, there is illustrated in block diagram form the various component stages of the voltage level detector comprehended by the invention. A differential amplifier and voltage reference stage 8 is connected between input terminal 15 and ground bus 13. Voltage amplifier stage 9 is connected between energy storage circuit bus 16 and differential amplifier and voltage reference 8. Energy storage circuit bus 16 is supplied by energy storage circuit 7. Transconductance compensating circuit 10 is connected between voltage amplifier 9 and ground. The output stage of the detector is represented by output circuit 12 of the block diagram and responds to the output of voltage amplifier 9 as modified by time delay circuit 11.

Referring now to FIG. 2, there is illustrated a detailed schematic of one embodiment of the invention. The voltage to be detected and monitored is applied to input terminal 15 and appears on input bus 14. The energy storage network comprises diode 19 and resistor 18. The output of the energy storage network is delivered to the remaining circuits via energy storage network bus 16. A voltage divider network comprising resistors 20 and 22 is connected between input bus 14 and ground bus 13. The differential amplifier and voltage reference circuit of the detector comprises transistors 24 and 25, diode 26, zener diode 30, capacitor 27 and resistors 23, 28, 40, 29 and 31. The voltage amplifier stage comprises transistors 32 and 33, diode 34 and resistors 35, 37 and 38. The transconductance compensating circuit comprises diode 39 and resistors 41, 42, 43, 44 and 45. The time delay circuit consists of capacitor 46 and resistors 47 and 48. The output stage of the voltage level detector comprises transistors 49, 50 and 51, diodes 52 and 53 and resistors 54, 55, 56, 57, and 58. System output is provided at output terminal 17.

Referring now to FIG. 3, there is illustrated thereby a second presently preferred embodiment of the voltage level detector comprehended by the invention. The differential amplifier and voltage reference stage of this embodiment comprises transistors 70 and 71, Zener diode 73, capacitor 72 and resistors 74, 75, 76 and 77. The transconductance compensating circuit comprises resistors 60, 61, 64, 65, 66 and 67 and diode 62. The voltage amplifier comprises transistor 63 and resistors 68 and 69. The time delay circuit includes diode 79, capacitor 78 and resistors 80 and 81. The output circuit includes transistors 82 and 83, capacitors 84, 85, 86 and 87 and resistors 88, 89, 90, 91 and 92.

Figure 4:
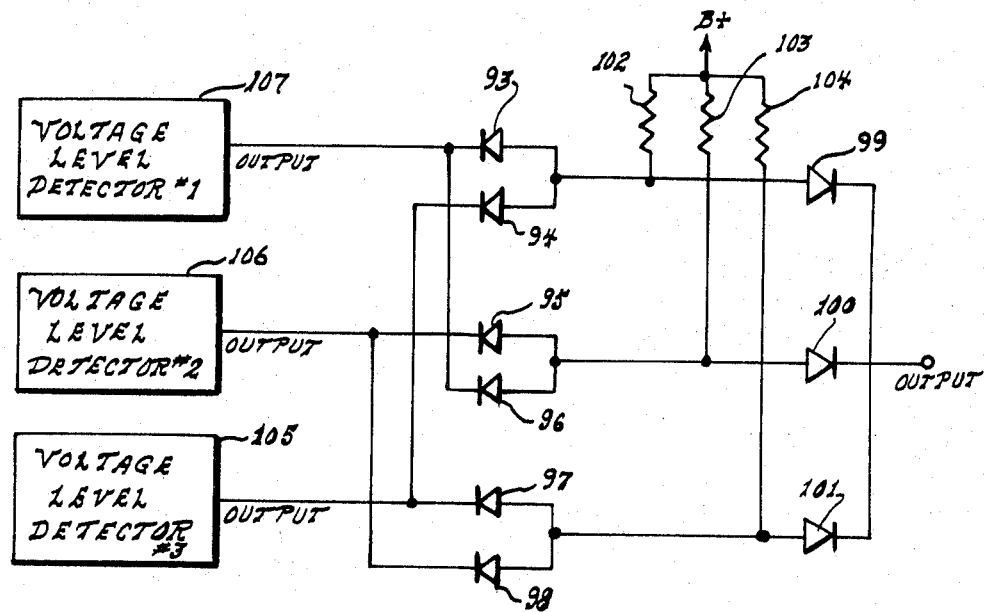
FIG. 4 illustrates partly in block diagram form and partly in schematic form a voltage monitoring system comprehended by the present invention.

The voltage monitoring system and majority voting logic circuit is illustrated by FIG. 4. This system comprises voltage level detectors 105, 106 and 107 in combination with the diode logic circuit of diodes 93, 94, 95, 96, 97, 98, 99, 100 and 101. B+ voltage is supplied through resistors 102, 103 and 104 to the three output circuits of the majority voting logic circuit.

While the invention has been described in its preferred embodiments, it is understood that the words which have been used are words of description rather than words of limitation and that changes within the purview of the appended claims may be made without departing from the scope and spirit of the invention in its broader aspects.

I claim:

1. A voltage level detector comprising:
   terminal means for connection to a voltage source to be monitored;
   ground means;
   an energy storage circuit having an output bus;
   first and second resistors connected in series between said terminal means and said ground means;
   a differential amplifier comprising first and second NPN transistors, the emitters of said NPN transistors being connected to said ground means through a third resistor, the collector of said first NPN transistor being connected to said terminal means through a fourth resistor, the collector of said second NPN transistor being connected to said terminal means through series connected fifth and sixth resistors, the base of said first NPN transistor being connected to the junction of said first and second resistors, and the base of said second NPN transistor being connected to said energy storage bus through series connected seventh and eighth resistors;
   a voltage amplifier comprising first and second PNP transistors, the emitter of said PNP transistors being connected to said terminal means, ninth and tenth resistors connected in series between said terminal means and the collector of said first PNP transistor, means connecting the base of said first PNP transistor to the junction of said fifth and sixth resistors, means connecting the base of said second PNP transistor to the junction of said ninth and tenth resistors, eleventh and twelfth resistors connected in series between the base of said first PNP transistor and the base of said second NPN transistor, a thirteenth resistor connected to the collector of said first PNP transistor, a first diode connected between said thirteenth resistor and said ground means, means connecting the collector of said first PNP transistor to the junction of said eleventh and twelfth resistors, fourteenth and fifteenth resistors connected in series relationship between the junction of said first diode and said thirteenth resistor and said ground means, a first capacitor connected between the base of said first NPN transistor and said ground means, a second diode connected between the emitter and the base of said first NPN transistor, a Zener diode connected between the junction of said fourteenth and fifteenth resistors and the junction of said seventh and eighth resistors;
   an output circuit comprising the series arrangement of a sixteenth resistor connected to the collector of said second PNP transistor, a third diode connected to said sixteenth resistor and a seventeenth resistor connected to said third diode, and
   a time delay circuit comprising a second condensor connected between the junction of said third diode and said seventeenth resistor and said ground means, and an eighteenth resistor connected between said seventeenth resistor and said ground means.

2. A voltage level detector comprising:
   terminal means for connection to a voltage source to be monitored;
   ground means;
   a first resistance connected to said terminal means, a first diode connected to said first resistance and a second resistance connected between said first diode and said ground means;
   a differntial amplifier comprising first and second NPN transistors, the emitters of said NPN transistors being connected to said ground means through a third resistor, the collector of said first NPN transistor being connected to said terminal means through series-connected fourth and fifth resistors, the collector of said second NPN transistor being connected to said terminal means through a sixth resistor;
   seventh and eighth resistors arranged in series relationship and connected in parallel with said first diode;
   means connecting the base of said first NPN transistor to the junction of said seventh and eighth resistors;
   a first capacitor connected between the base of said first NPN transistor and said ground means;
   a ninth resistor connected to terminal means;
   a zener diode connected between said ninth resistor and said ground means;
   means connecting the base of said second NPN transistor to the junction of said Zener diode and said ninth resistor;
   a voltage amplifier comprising a PNP transistor, the emitter thereof being connected to said terminal means, and the base thereof being connected to the junction of said fourth and fifth resistors;
   a tenth resistor connected between the collector of said PNP transistor and said ground means;
   an eleventh resistor connected between the collector and the base of said PNP transistor;
   a twelfth resistor connected between the collector of said PNP transistor and the base of said first NPN transistor;
   a thirteenth resistor connected to the collector of said first PNP transistor;
   a second diode connected to said thirteenth resistor;
   a second capacitor connected between said diode and said ground means;
   a fourteenth resistor connected between the junction of said second diode and said second capacitor and said ground means; and
   an output circuit, said output circuit being connected to the junction of said second diode and said second capacitor through a fifteenth resistor.

3. A voltage monitoring system comprising three voltage level detector circuits, each said detector circuit comprising terminal means for connection to a voltage to be monitored, ground means, a differential amplifier connected between said terminal means and said ground means, a stable voltage source connected between said ground means, said terminal means and said differential amplifier, voltage amplifier means connected to the output of said differential amplifier, a feedback circuit connected between said voltage amplifier means and said differential amplifier, said feedback means being adapted to fix the gain of said voltage amplifier means, a temperature compensation circuit connected between said voltage amplifier means and ground, a time delay circuit connected to the output of said voltage amplifier means, and output means connected to said time delay circuit, first and second diodes connected in series relationship between the output of said first voltage level detector and the output of said third voltage level detector, third and fourth diodes connected in series relationship between the output of said second voltage level detector and the output of said first voltage level detector, fifth and sixth diodes connected in series relationship between the output of said third voltage level detector and the output of said second voltage level detector, an output terminal, a seventh diode connected between the junction of said first and second diodes and said output terminal, an eighth diode connected between the junction of said third and fourth diodes and said output terminal, and a ninth diode connected between the junction of said fifth and sixth diode and said output terminal.